Oct. 9, 1951        C. C. KINKER        2,570,817
GLASSWARE FORMING MACHINE
Filed May 11, 1946        11 Sheets-Sheet 1

INVENTOR
Clarence C. Kinker
By Green & McCallister
His Attorneys

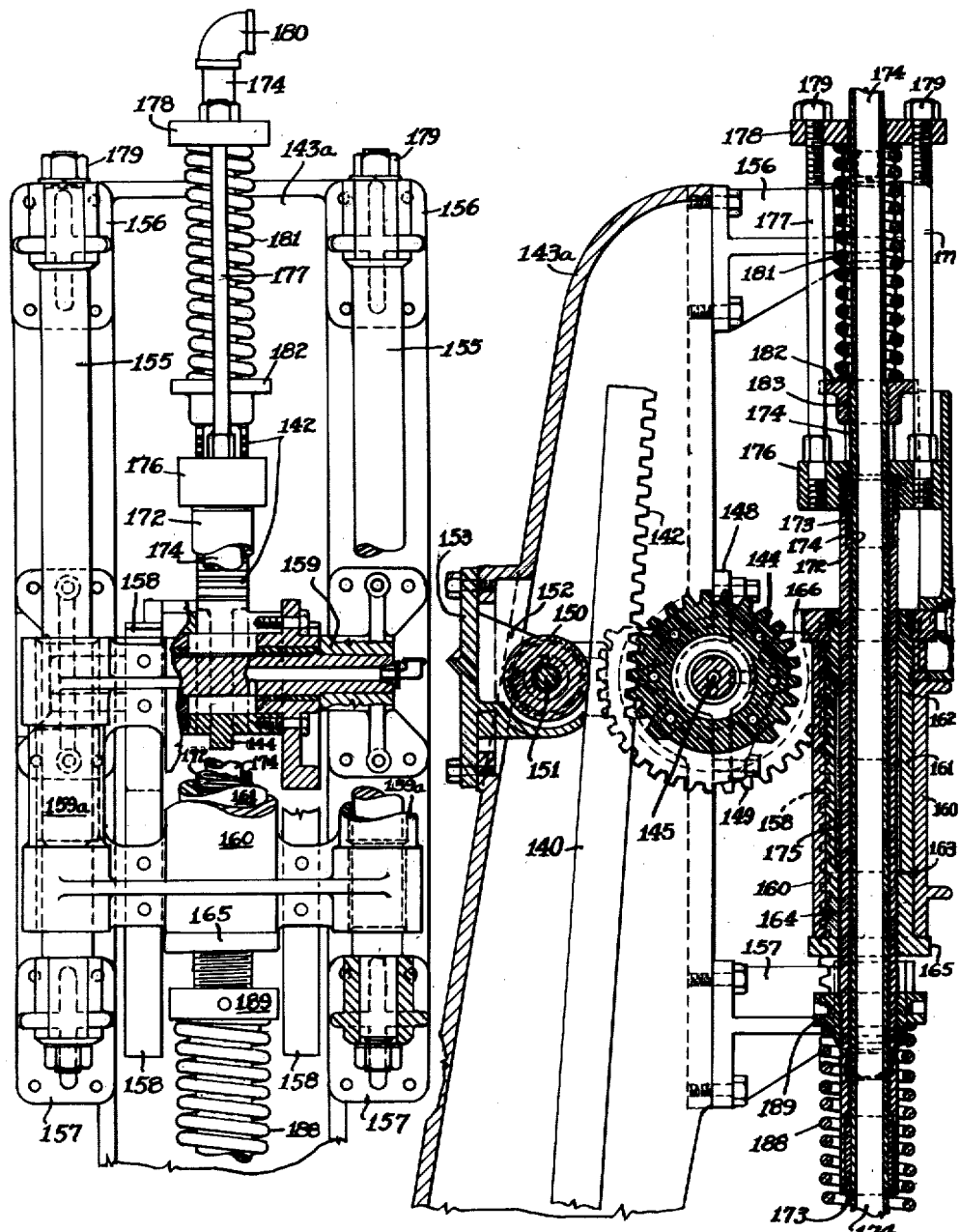

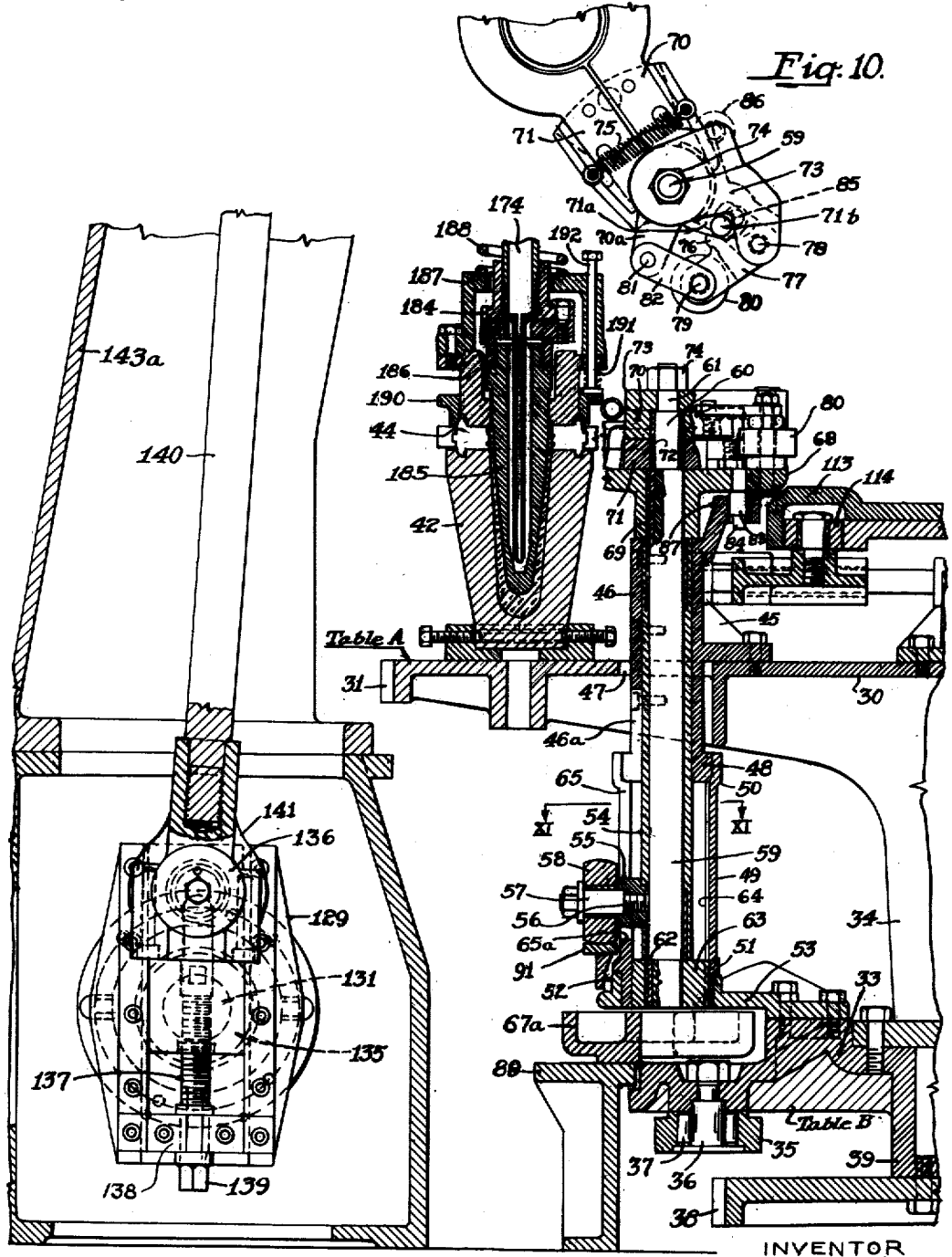

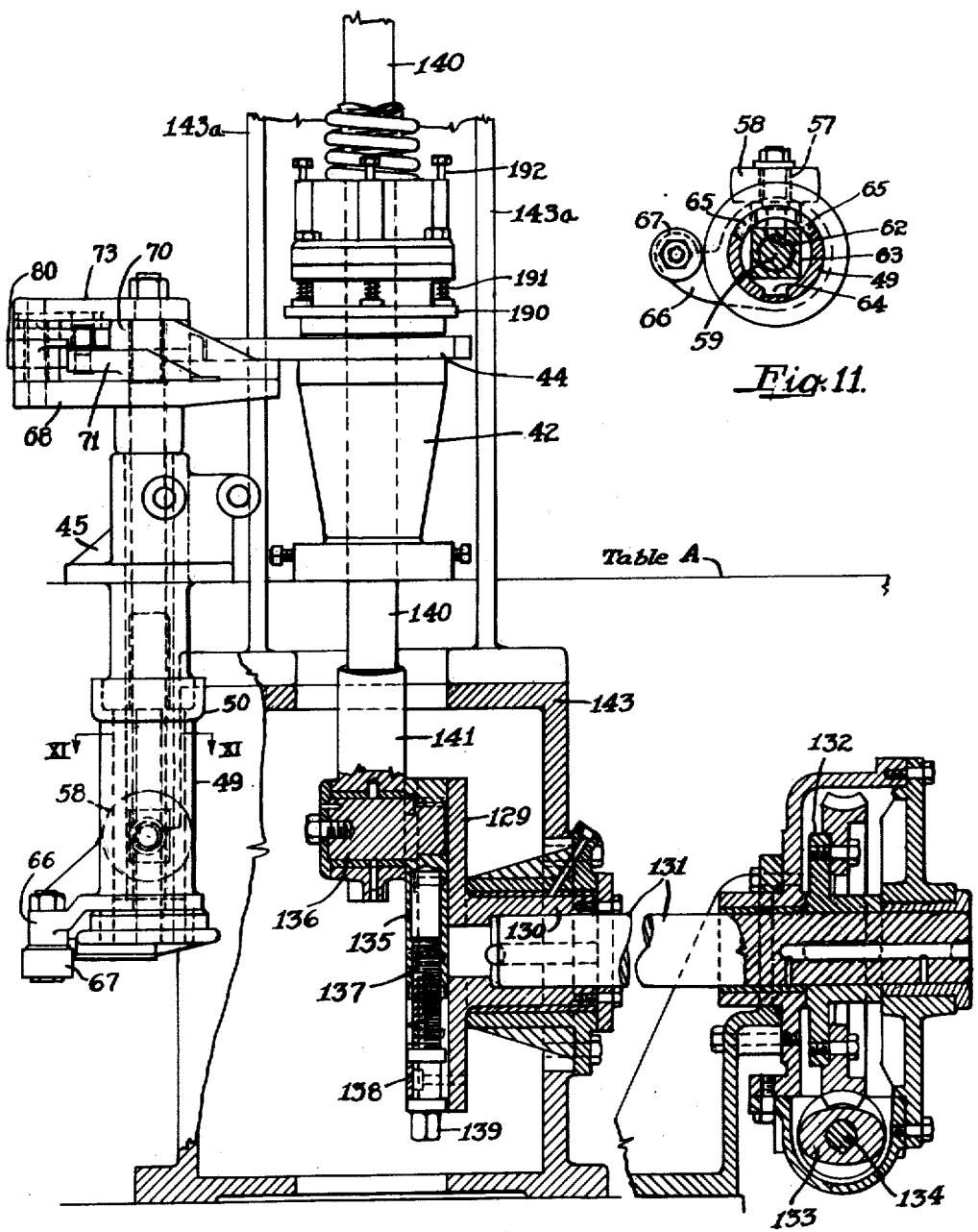

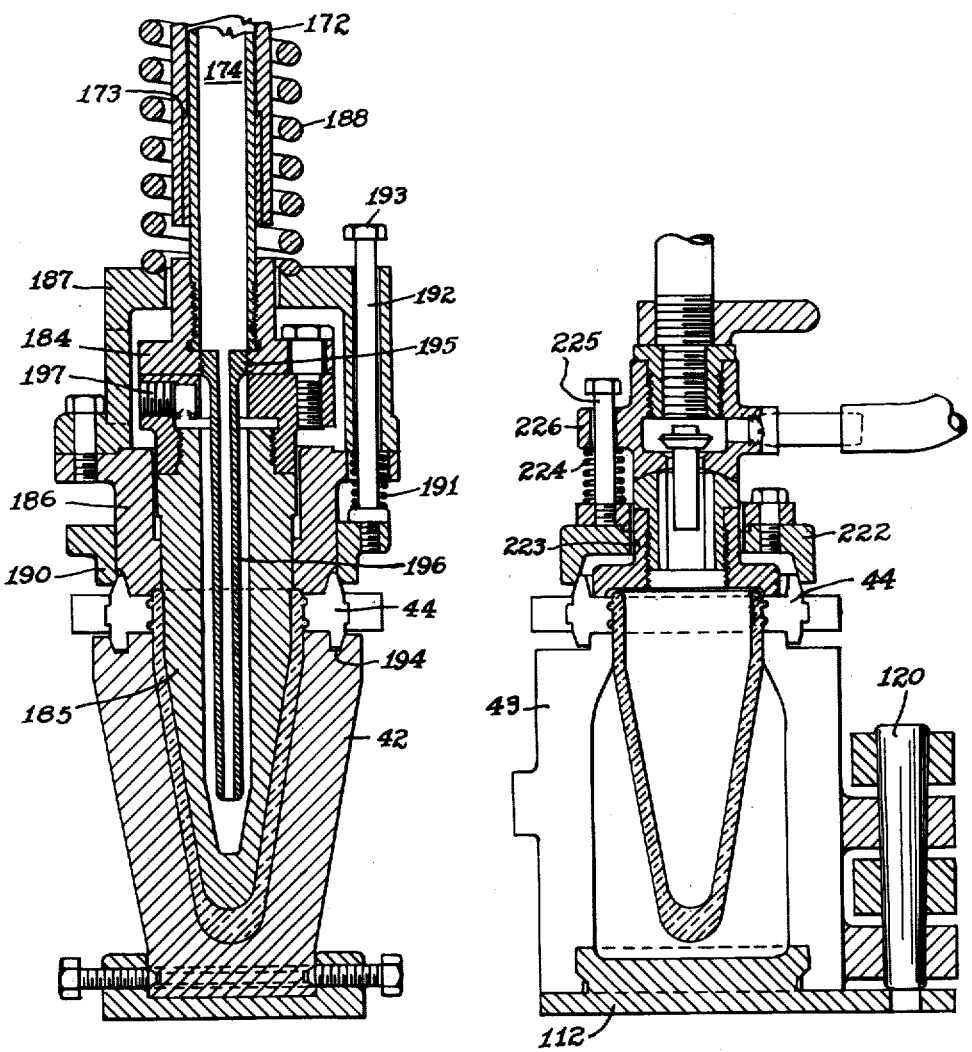

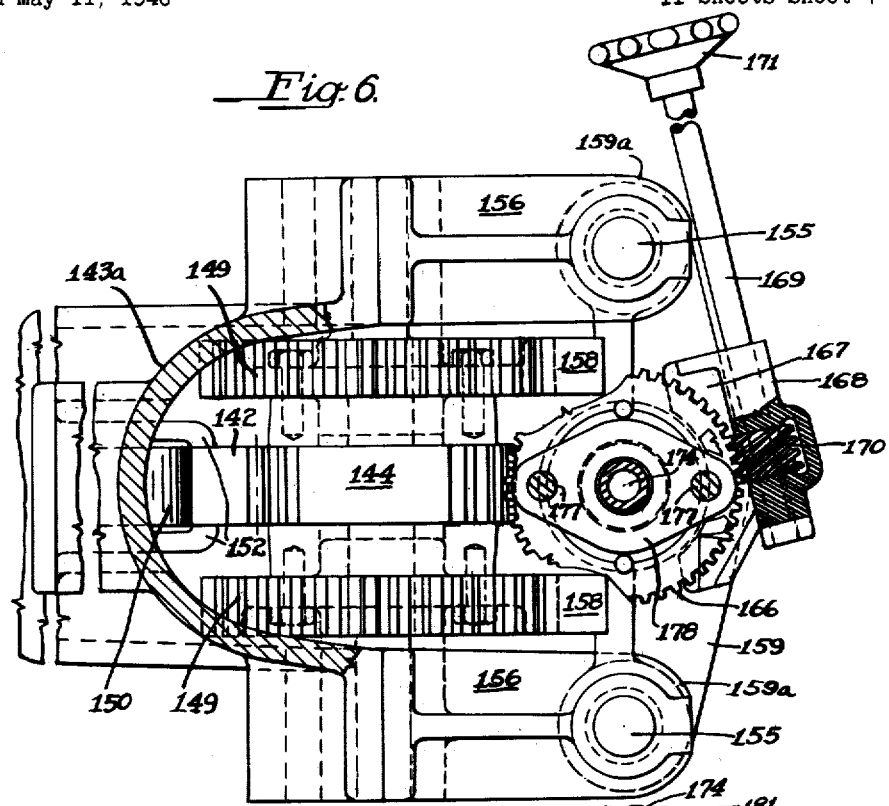

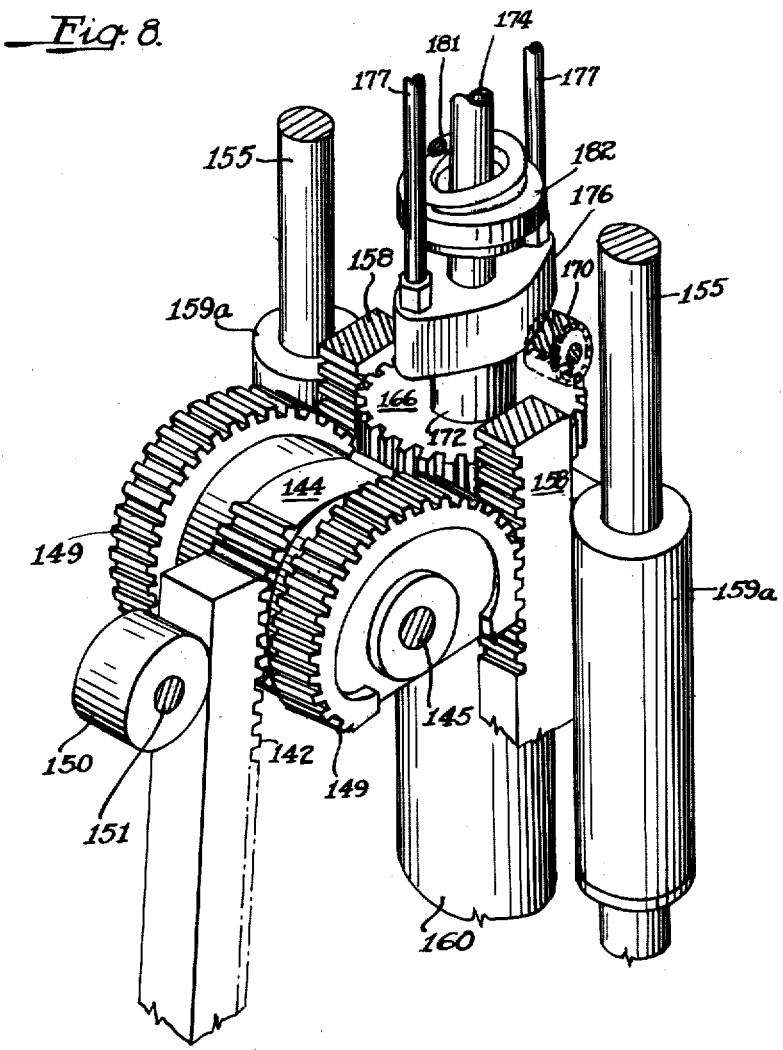

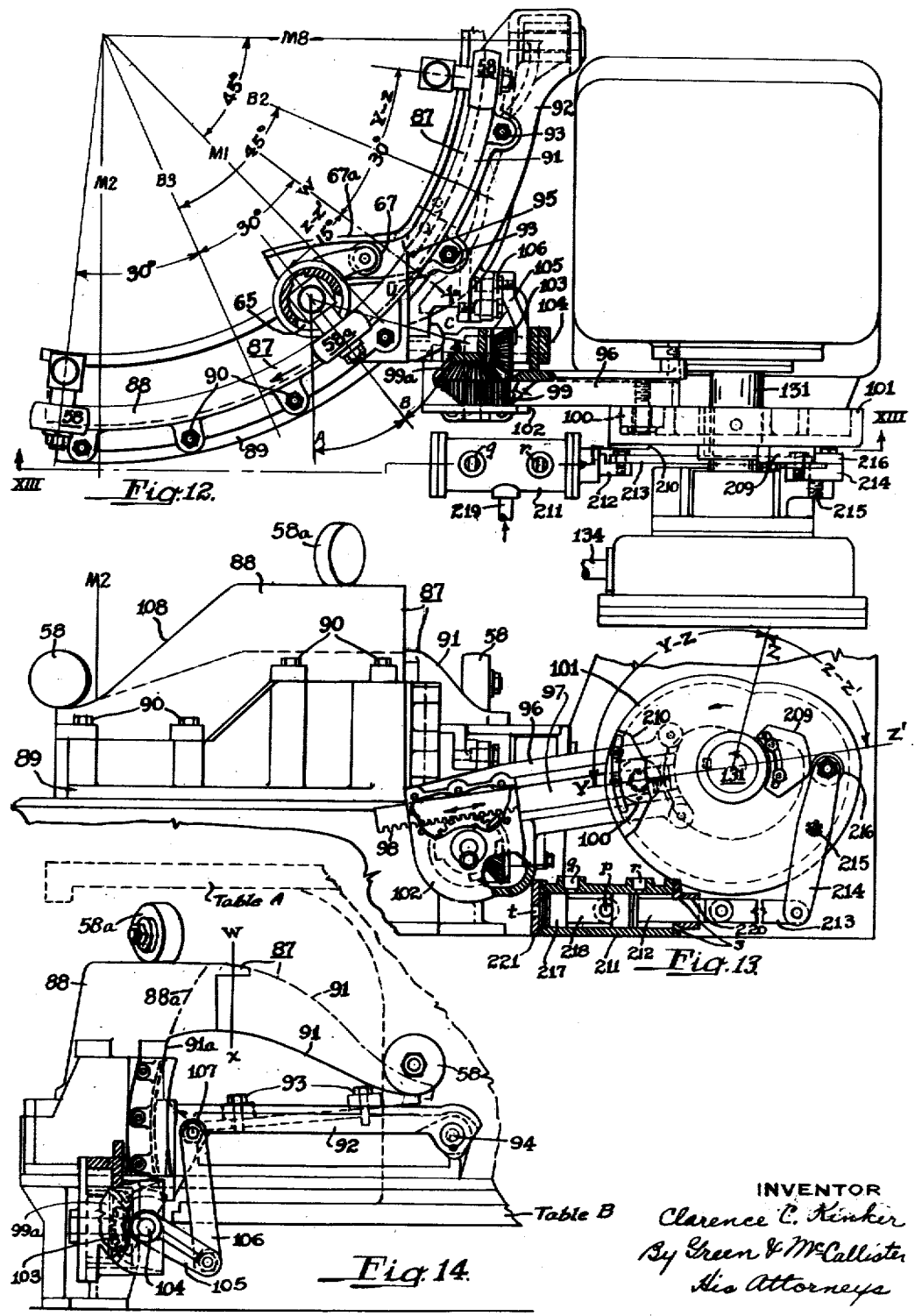

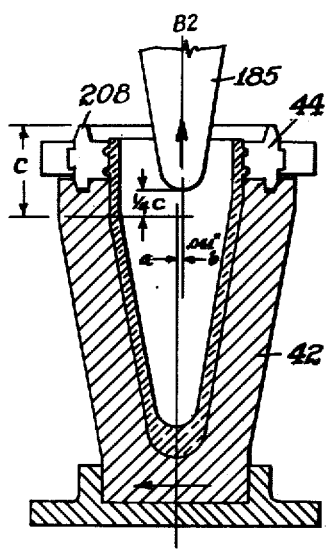
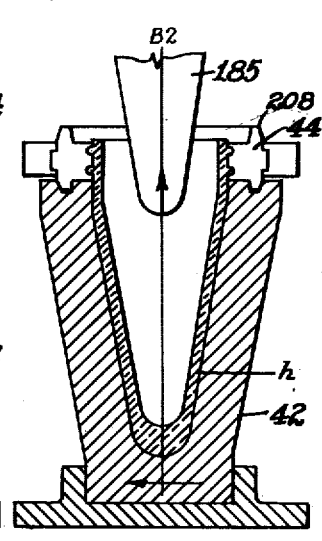
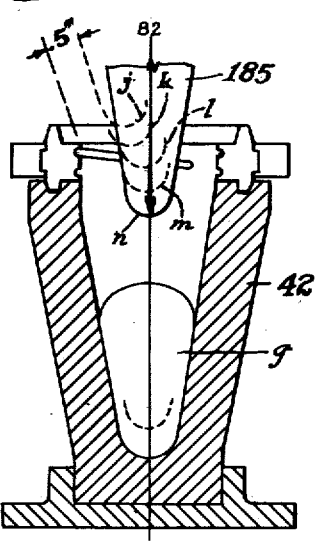
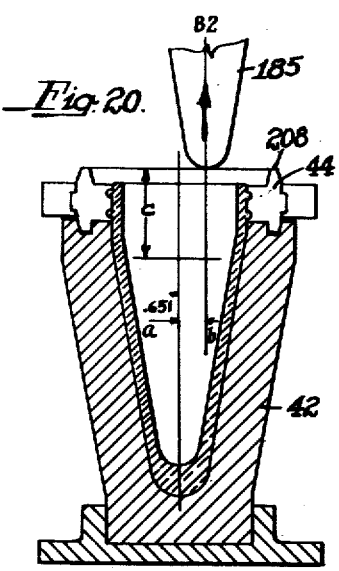
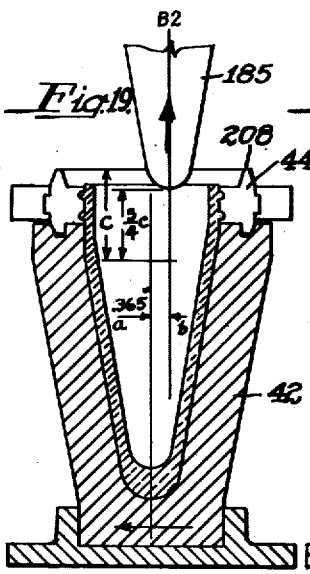
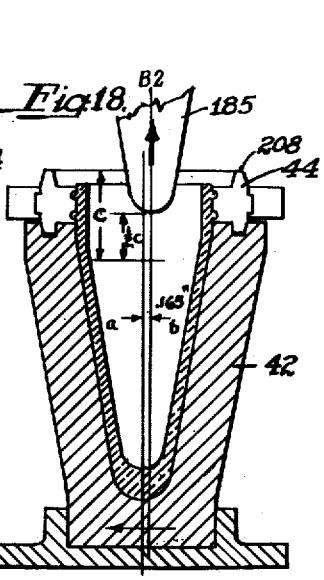

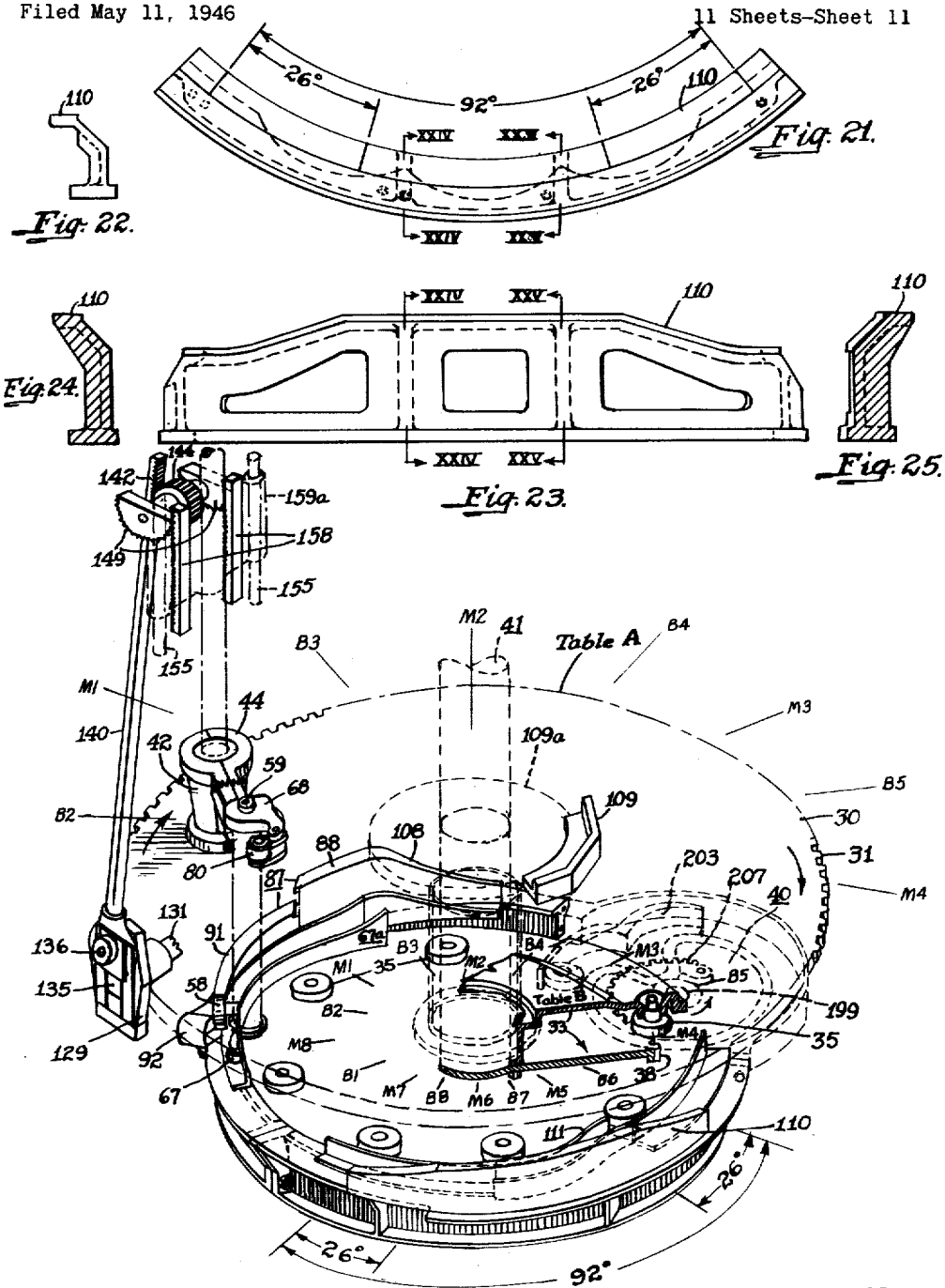

Patented Oct. 9, 1951

2,570,817

UNITED STATES PATENT OFFICE 2,570,817

GLASSWARE FORMING MACHINE

Clarence C. Kinker, Defiance, Ohio, assignor to O'Neill Patents Limited, a corporation of Canada Application May 11, 1946, Serial No. 669,164

6 Claims. (Cl. 49—9)

This invention relates to press and blow glassware forming machines of the stop and go type and an object of this invention is to produce an improved machine of this type.

Another object is to produce an improved liftover transfer mechanism for glassware forming machines.

Another object is to produce in a glassware forming machine driven by an electric motor through a periodic motion mechanism, a mechanical parison pressing device which is driven by said motor and operates in synchronism with the mold carrying table.

A further object is to produce in glassware forming machines, a mechanically operated (as distinguished from an air operated) pressing device for forming the parisons which can be adjusted, as to the length of pressing stroke, during operation of the device.

A further object is to produce a single table, stop and go, press and blow glassware forming machine in which the parison forming operation is performed by a mechanical pressing device operating in synchronism with the table movements and driven by the table driving motor.

Another object is to produce an improved mechanically operated device for pressing the parisons in a stop and go machine.

Another object is to produce an improved device for transferring a parison from a blank mold to a finishing mold in a stop and go machine.

A further object is to produce an improved press and blow machine of the stop and go type in which the parison or blank molds and the finishing or blow molds are mounted on the same table.

A further object is to produce improved means for clamping the neck rings or molds to the parison or blank molds and the blow or finishing molds in a press and blow machine.

A further object is to produce an improved motor operated cam mechanism in a stop and go machine for raising the neck ring or mold during the parison transfer operation.

A still further object is to produce in a stop and go machine, improved means for operating the parison pressing mechanism by the table driving motor while the table is at rest during its stop periods.

A still further object is to produce a mechanically operated plunger mechanism for pressing the parisons in a stop and go machine which can be adjusted during the parison pressing operation in order to increase or decrease the set of the plunger in the glass.

I attain these, and other objects by means of the machine described in the specification and illustrated in the drawings accompanying and forming part of this application.

In the drawings:

Figure 1 is a top plan view of a glassware forming machine embodying this invention. The blow head at the first blowing station is omitted and part of the upper portion of the pressing device is shown in section.

Figure 2 is a view taken below the mold carrying table of Fig. 1 and is partially in top plan and partially in section. This view discloses some of the stationary cams, the periodic motion drive mechanism by which the molds on the carrying table are indexed from station to station, the driving motor, the reduction gear between the driving motor and the periodic motion mechanism, and the means by which the parison pressing or forming device is driven in synchronism with the periodic motion mechanism and, therefore, the mold carrying table.

Figs. 3 and 3a are to be taken together and, when so taken, constitute a sectional elevation of the parison pressing or forming device. This view is taken on the angled line III—III of Fig. 1. The right-hand portion of Fig. 3a is a view in sectional elevation of one of the transfer devices of the machine. The right and left-hand portions of Fig. 3a are taken in different planes. The neck ring holder disclosed in the right-hand portion is shown broken from the neck ring. The transfer device is shown in its lowest position, the position which it occupies when the neck ring or mold is clamped to the top of the blank mold as shown in the left-hand portion of this view.

Figs. 4 and 4a are to be taken together, and when so taken, constitute a view partially in elevation, and partially in section of the parison pressing and forming device, and one of the transfer devices. This view is taken on line IVa of Fig. 1, looking in the direction of the arrow.

Fig. 5 is a view in sectional elevation of one of the blank or parison molds, and the plunger of the parison pressing or forming device. This view shows the pressing plunger in the glass as it appears at the end of a pressing stroke.

Fig. 6 is a detail view of part of the parison pressing device and is taken on line VI—VI of Fig. 7.

Fig. 7 is a detail view in side elevation of that portion of the pressing device shown in Fig. 6.

Fig. 8 is a perspective view of those portions of the parison pressing device illustrated in Figs. 6 and 7.

Fig. 9 is a sectional view taken through one of the blow molds and shows the lower portion of one of the blow heads clamping the neck ring to the blow mold. In this view the parison is shown suspended within the blow mold by the neck ring or mold preparatory to blowing.

Fig. 10 (on the sheet with Fig. 3a) is a fragmental top plan view of one of the transfer devices of this invention with the neck mold or ring in closed position.

Fig. 11 (on the sheet with Fig. 4a) is a sectional view taken on line XI—XI of Fig. 4a.

Fig. 12 is an enlarged top plan view of portions of the mechanisms shown in the lower left-hand half of Fig. 2.

Fig. 13 is a view taken on line XIII—XIII of Fig. 12. The left-hand half of this view is an elevational view of the portions shown on the left-hand side of Fig. 12.

Fig. 14 is an elevational view of one of the cams and the operating mechanism for a part thereof, looking toward the left at the top central portion of Fig. 12.

Figure 1:
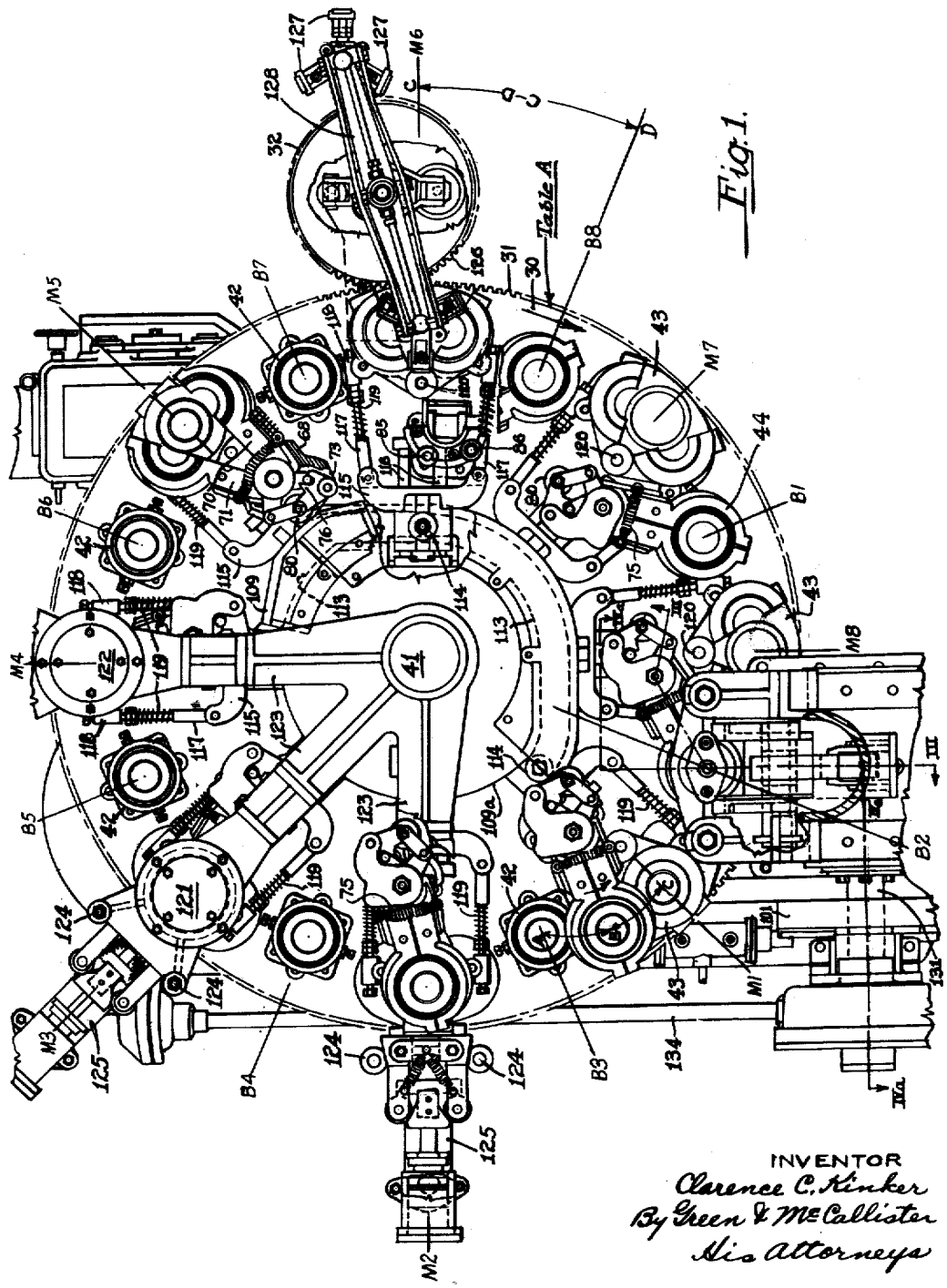

Figs. 15 to 20 inclusive, are diagrammatic views depicting the introduction of the pressing plunger into a blank mold and the withdrawal of such plunger from such mold.

Fig. 21 is a top plan view of one of the cams;

Fig. 22 is an end view looking toward the left-hand end of Fig. 21;

Fig. 23 is a side elevational view of the cam of Fig. 21;

Fig. 24 is a view taken on line XXIV—XXIV of Fig. 23;

Fig. 25 is a sectional view taken on line XXV—XXV of Fig. 23; and

Fig. 26 is a schematic perspective view of the mold carrying table, the stationary cam supporting platform, certain cams secured to said platform, a diagrammatic showing of one of the transfer devices, and a diagrammatic showing of the pressing device. This view shows the relative positions of said cams with relation to the pressing device.

The machine chosen for illustrating this invention is a single table machine. This table, which carries the molds and the transfer devices, is mounted for rotation about a stationary column and is driven by an electric motor through the medium of a periodic motion mechanism arranged to advance the table half the time and lock it in idle position half the time.

In order that the periodic movements imparted to the table by such mechanisms are of equal length and duration, I preferably utilize a periodic motion drive mechanism such as disclosed in Figs. 10 to 19 inclusive of my United States Patent 2,298,215 of October 6, 1942. This mechanism employs two cams, one for starting and one for stopping the table and a gear quadrant which moves the table at a uniform rate after being started and before being stopped by such cams.

The table carries a series of pairs of molds and each such pair comprises a blank or parison mold and a partible blow or finishing mold. A partible neck ring or mold is associated with each such pair and in the machine of this application, I show eight blank or parison molds and eight blow or finishing molds alternately arranged in a circular row. This, however, is not to be taken as limiting the invention to any certain number of pairs of molds. The angle of each table movement or index is, therefore, 45°. The table also carries a cam operated lift-over transfer device associated with each neck ring or mold.

The blank and blow molds are mounted in the same horizontal plane on the mold carrying table and these molds are of the same height.

The mechanical parison pressing device is operated by the electric motor that drives the periodic motion mechanism and this pressing device operates in synchronism with the table and while the table is locked in its stop or idle position.

Each blank mold with its neck mold clamped to its top, at the charging station receives a measured charge or gob of glass from any well known or suitable glass feeder. This charge is dropped through the neck mold into the blank mold. The mold table is then indexed to the next station, at which station the parison pressing operation takes place. During this pressing operation, the neck or finish of the jar or bottle is formed by the neck mold.

Each neck mold remains closed around the "finish" section of the parison from the time the parison is formed until just prior to the time the finished bottle or jar reaches the takeout point of the machine.

During the two indexing periods following the pressing operation, the parison is raised by the neck mold clear of the parison mold, and by the transfer device, of which the neck mold forms a part, is swung into position over the blow or finishing mold. The parison is then lowered by the transfer device into the finishing mold. A blow head is then lowered into contact with the neck mold.

The finishing blow in this machine is carried out by three blow heads which operate in succession on each blow or finishing mold. In other words, each blow or finishing mold is succesively moved to position below three blow heads each of which performs a blowing operation. The first blow expands the parison to finished form and the two succeeding blows supplement the first and insure a complete finishing blow.

After the table index succeeding the final phase of the finishing blow—that occasioned by the last of the three blow heads—the neck mold is opened, leaving the finished article in the blow mold. The neck mold is then lifted clear of the neck or finish of the bottle or jar protruding above the top of the blow or finishing mold, is swung to position above its blank mold and lowered to assembled position on top of such mold. The blow or finishing mold is then opened, exposing the finished bottle or jar which is then removed by the take-out device.

The blank or parison mold with its neck mold in assembled position thereon is again charged and the cycle is repeated.

In the machine disclosed in the drawings, the mold carrying table A comprises a circular mold support portion or platform 30 having its outer peripheral edge provided with gear teeth 31 (Figs. 1 and 3a) for operating the take-out device 32 to be referred to later. A spider 33 supported below platform 30 by a web-like structure 34 carries a circular row of equally spaced rollers 35. These rollers are mounted for rotation on depending stub shafts 36 and are provided with anti-friction bearings as shown at 37 in Fig. 3a.

A gear 38 located below rollers 35 is connected to spider 33 by a connecting member 39. Rollers 35 and gear 38 form the connection between the periodic motion mechanism which is numbered 40 as an entirety and mold carrying table A.

Table A, by means of suitable bearings not shown, is mounted for rotation about a central stationary column 41 secured to a suitable bed plate as will be understood, but which is not shown.

Platform 30 of Table A carries a circular row of blank or parison molds 42 and a circular row of blow or finishing molds 43 (Figs. 1, 3a, 4a and 9). The two circular rows of molds are concentric; the centers of the finishing molds are preferably further from central column 41 than the centers of the blank or parison molds in order to accommodate the finishing mold opening and closing mechanism.

The molds, which are of standard type, are shown in Figs. 5 and 9. In Fig. 5, which illustrates the blank or parison mold, the neck ring 44 is shown clamped or locked to the top of the parison mold by means forming part of the parison pressing device. In Fig. 9, the neck ring is shown clamped to the top of the blow or finishing mold by means forming part of the blow head.

The blank or parison molds and the blow or finishing molds are arranged alternately around the mold table and each pair of molds comprising a blank mold and a blow mold, has its particular neck ring, neck ring holder and transfer device; the neck ring and neck ring holder forming part of the transfer device.

Transfer device

The transfer devices are carried by and bolted to platform 30 by means of bracket members 45 (Figs. 2, 3a and 4a) and since all the transfer devices are the same, a description of one will suffice.

Bracket 45 is formed as part of a fixed tubular housing 46 which is square in cross section and extends above platform 30 and down through an opening 47 in said platform to form a slide box. This square tubular slide box at its lower end terminates in a cylindrical shoulder-like portion 48 which forms the upper bearing for a hollow rotatable cylindrical housing 49. Housing 49 at its upper end 50 bears against bearing portion 48 and at its lower end 51 finds a bearing seat 52 on the upstanding cylindrical portion of bracket member 53 which is bolted to the upper face of spider member 33.

Figure 2:
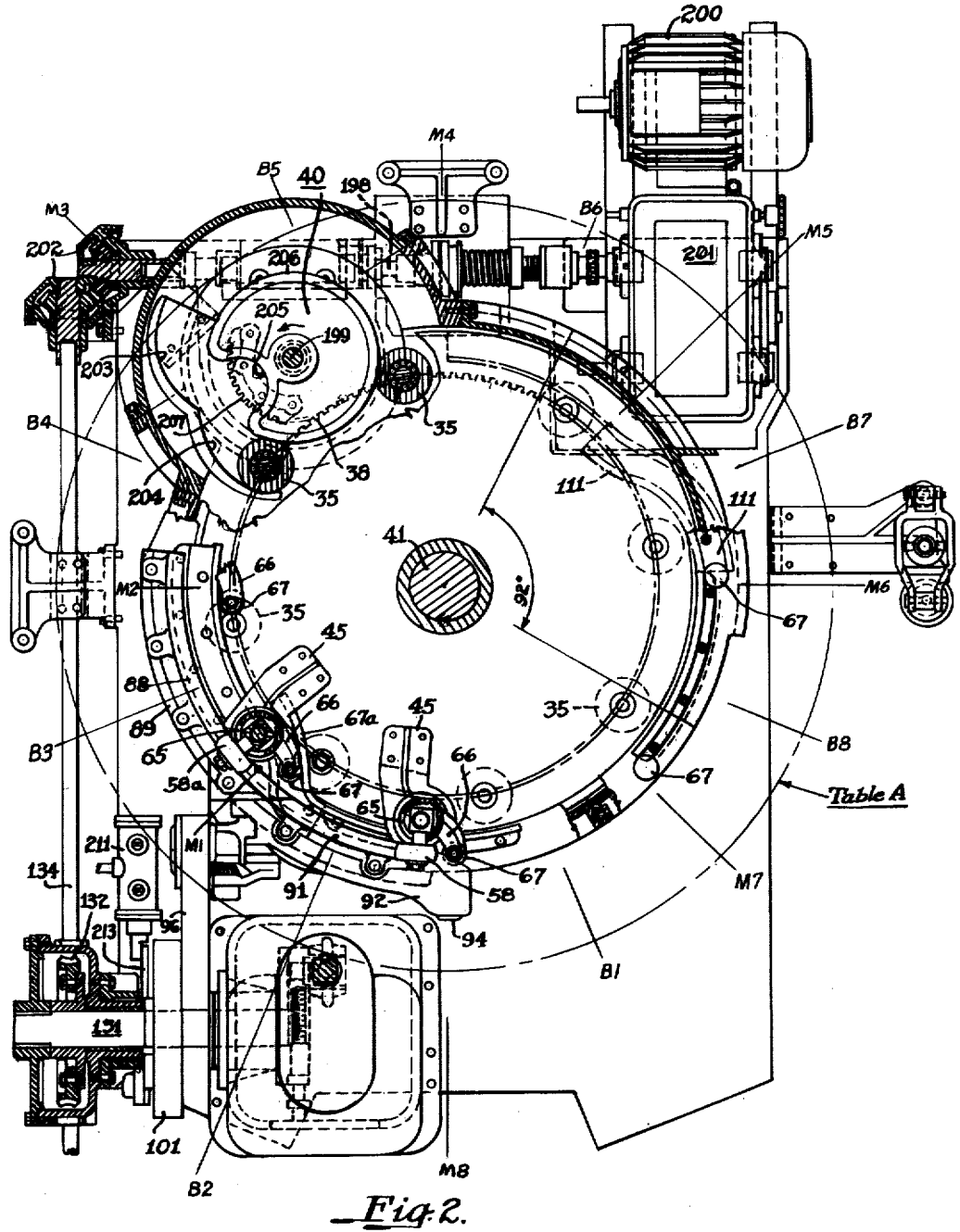

A member 54 formed as a tubular slide is externally square in cross section, as shown in Figs. 2 and 11, and has a cylindrical bore extending therethrough from end to end. Slide member 54 is arranged to slide within stationary housing 46 and of course is held by said housing from turning or twisting. Adjacent its bottom, slide member 54 has a pad 55 welded thereto. This pad is drilled and tapped to receive the reduced threaded end 56 of a stub shaft 57.

Mounted for rotation on stub shaft 57 is a bushed cam contact roller 58, as shown in Fig. 3a.

A cylindrical shaft 59, having two reduced portions 60 and 61 at its upper end, extends through the bore in slide member 54, and at its lower end is keyed, as at 62, to a collar 63 which has a sliding fit within tubular housing 49 to which it is splined as at 64. It will therefore be seen that shaft 59 is free to slide vertically with relation to housing 49, but is caused to turn or partially rotate as housing 49 is rotated.

Housing 49 on its outer side, or that side adjacent roller 58, is provided with a wide angled slot as shown at 65 in Figs. 2, 3a and 11. This slot which extends from point 65a near its bottom to its top permits limited rotation of housing 49 about slide 54. Stationary housing or slide box 46 below platform 30 is also slotted as indicated at 46a. The slots in housing 49 and slide box 46 permit vertical movement of slide 54 with its roller-shaft carrying pad 55 which extends through these slots. These slots also permit cam contact roller 58 to remain tangent to its raising and lowering cam (to be later referred to) during swinging of the neck ring to and from the molds with which it is associated.

Rotatable housing 49 is provided with an outwardly and downwardly projecting arm 66 carrying a vertically extending stub shaft upon which a cam contact roller 67 is mounted for rotation (Figs. 2, 4a and 11).

Roller 67, by means of cam 67a (Fig. 2) causes swinging of the neck ring from position above the blank mold to position above the blow mold and vice versa, as will later appear.

A member 68, formed as a clevis which has a downwardly extending hollow cylindrical portion which, when in down position as shown in Figure 3a, rests on the top of tubular slide 54, is keyed to shaft 59 as at 69 and forms a support for the mechanism for opening and closing the neck ring. This mechanism comprises neck ring support arms or holders 70 and 71 which are supported by member 68 and are mounted and arranged to swing about a bushing 72 which surrounds reduced portion 60 of shaft 59. The upper arm 73 of this clevis which surrounds the reduced upper end 61 of shaft 59, is locked in place by a nut 74 threaded to the upper end of shaft 59. Neck ring holder arms 70 and 71, are normally held in contact one with the other by a tension spring 75.

Holder arm 70 is provided with an offset lever arm 70a and holder arm 71 is provided with a lever arm 71a which carries an upstanding pin 71b. Pin 71b is engaged by the forked end 76 of a lever 77 mounted on a pin 78 carried by portions 68 and 73 of said clevis. The outer end of lever 77 is bifurcated and a pin 79 extending through the furcate parts thereof has a cam contact roller 80 mounted thereon. Lever arm 70a carries a pin 81 and this pin and pin 79 are connected by a link 82.

The construction and arrangement of this neck ring or neck mold operating mechanism is such that when cam contact roller 80 is moved toward shaft 59 by its cam (to be later referred to), just prior to reaching the take-out point, the neck ring holder arms 70 and 71, and therefore the neck ring halves, are moved apart in opposition to the tension of spring 75 to release the finished jar or bottle. Clevis member 68 (which is raised, lowered and rotated as shaft 59 is raised, lowered and rotated) is provided with a depending pin 83 having a tapered lower end as at 84 which is adapted to be lowered into and raised from two bushed holes 85 and 86 in an arm which extends upwardly from the top of slide box 46 (Figs. 1, 3a and 10). When located within either of these holes, the neck ring in closed position is in contact with the top of the blank mold or blow mold as the case may be. This pin lock insures alignment of the neck ring or mold with the blank mold or the blow mold and is only effective when the transfer device is in its lowest position, with the neck ring in contact with the top of either the blank or the blow mold. The neck ring or neck mold which forms part of each transfer mechanism holds the parison by its "finish" section (which is formed by the neck mold) while the parison is being transferred from the blank mold to the blow mold as before pointed out. The prolonged contact between the neck mold and the "finish" section of the parison chills the "finish" section and also insures proper support for the parison while the machine is in motion and during any sudden starts and stops.

With types of transfer means employing "grips" or "pinchers," distortion of the "finish" section often occurs. This causes faulty fitting of the closures for the article or an uneven top that will cause poor sealing of the closure.

Stations

For the purpose of simplifying the location of the cams and the description of their functions, I have indicated on Figs. 1, 2 and 26 eight positions which I designate as blank mold stations and eight positions which I designate as blow mold stations. The blank mold stations which are lettered B-1 to B-8 inclusive are the positions of the blank molds when the mold carrying table stops between indexes and the blow mold stations M-1 to M-8 inclusive are the positions of the blow molds at that time.

A charge or gob of glass is delivered to each blank mold as it arrives at station B-1, by any suitable charging device (not shown) operating in synchronism with the machine. The parison pressing operation takes place at station B-2. Transferring of the parisons from the blank molds to the blow molds takes place between stations M-1 and M-2. The first phase of the blowing occurs at station M-2, the second phase at M-3 and the third phase at M-4. The neck ring is opened just before it reaches station M-5. The finished ware (bottle or jar) is removed from the blow or finishing mold which is fully open as it reaches station M-6. The neck ring is closed and swung to position over the blank mold prior to reaching station B-1 where, as before said, the charging occurs.

The neck mold remains closed around the "finish" section of the parison from the time the parison is formed until just prior to the time the finished bottle or jar reaches the takeout point of the machine, as before pointed out. Because of this, distortion of the "finish" section due to stretching of the parison while being blown to final form is prevented. Actual contact of the blowing heads with any part of the glass is also prevented.

The first phase of the blowing which occurs at station M-2, if desired can be just sufficient to "puff" or slightly elongate the parison until its bottom end just touches and spreads out over the finishing mold bottom plate. This centers the parison and puts it in shape for the second and third phases of the blowing procedure which occur at stations M-3 and M-4.

The "puffing" blow occasioned by the blow head at station M-2 can be obtained by placing an adjustable check valve in the line that raises the blow head so that the exhaust air (the air passing through this line when the blow head is lowered) can be throttled to reduce the speed on the down stroke of the blow head to a point where the blow head remains down and blows just long enough to permit a slight puff of air to enter, and slightly expand the parison. Blowing air of short duration at high pressure elongates the parison while a blow of longer duration at reduced pressure expands the parison more sidewise than lengthwise.

As has been before pointed out, the first stage blow occurring at station M-2 may if desired be sufficient to blow the parison to finished form. If this practice is followed, the blow at stations M-3 and M-4 may be supplemental to that at M-2 and be used to hold the glass in tight contact with the mold for the purpose of chilling the blown article and thus increasing production.

Cams for operating parison transfer device

The cams for operating each transfer device as the mold carrying table is indexed from the pressing station B-2 to the first phase blowing station M-2 are disclosed in Figs. 2, 3a, 12, 13, 14 and 26. As has been pointed out, in the machine of the drawings, the mold table is indexed eight times during each complete revolution, therefore the stop periods are 45° apart and the timing is such that they occur as each blank mold reaches charging station B-1 and pressing station B-2.

A cam which as an entirety is numbered 87 and which will be later described in detail, causes the neck ring with the parison suspended therefrom to be raised clear of the blank mold through the agency of slide member 54, shaft 59 and neck ring holders 70 and 71. Cam 87 also causes the parison to be lowered into the blow mold after the neck ring is swung to position above the blow mold by a cam 67a (Figs. 3a and 12) to be later described. Cam 67a rotates housing 49 and therefore shaft 59 through cam contact roller 67.

Since the lengths of the parisons for different length bottles or jars may range all the way from as little as about three inches to as much as about seven and one-half inches or more, it is therefore necessary to be able to vary the rise of cam 87. Due to the fact that a cam with a six or seven and one-half inch rise would necessarily present a climb so steep as to cause excessive side pressure on slide box 54 due to its overhung roller 58, I provide means for relieving this pressure and angle of climb. I do this by making cam 87 in two parts, one of which is fixed and one movable and power operated. Both of these two parts are made of different heights and can be changed in order to be able to make ware of different heights. Both parts of the cam are so made as to be readily removable from their respective cam holders.

The stationary part 88 of cam 87 is removably secured to stationary housing 89 of the machine by means of suitable bolts 90. The movable part 91 is removably secured to a hinged cam carrier 92 by means of bolts 93. Cam carrier 92, at its outer end, is pivoted to a part of stationary housing 89 as at 94.

The inner end 91a of cam part 91 is formed on the arc of a circle struck from pivot point 94 and the adjacent end 88a of cam part 88 is formed on the arc of a circle struck from the same center. This is indicated by dot and dash line in Figure 14. The meeting faces 88a and 91a as shown in Fig. 12 overlap as shown at 95 (Fig. 12).

Figs. 12, 13 and 14 disclose the mechanism for raising and lowering hinged cam part 91 in synchronism with the movements of the mold table. This raising and lowering mechanism comprises a slide box 96 having a slide 97 mounted therein and having one end 98 formed as a gear rack which meshes with a combination spur and bevel gear 99. The end of slide 97 opposite the gear rack is provided with a roller 100 which is engaged by a cam 101. This cam is shown in position to move the roller and slide to the right, and it is so arranged with relation to the timing cycle of the table indexing mechanism that as shown it is at the point at which the table is ready to start on its index which will move the blank mold at station B-2 to station B-3.

Rotation of cam 101 through the arc from Y to Z (Fig. 13) moves rack 98 through its complete length of travel. The arc Y—Z represents 115° of rotation of cam 101 and 30° of the 45° table index. Cam 101 is keyed to the drive shaft of the parison pressing device (to be later described) and rotates counterclockwise.

Slide 97 with its rack 98 is held in slide box 96, at the cam end, by the cam cover and at its rack end by a cover plate 102 which forms an end bearing for the shaft of the combination spur and bevel gear 99.

A bevel gear quadrant 103 meshes with bevel gear 99a forming part of the combination spur and bevel gear 99. Shaft 104 of gear quadrant 103 has a lever arm 105 secured thereto and the outer end of this lever arm, by means of a link 106, is connected to the free end of cam support or holder 92 as at 107, so that said holder with cam part 91 is raised and lowered about its pivot point 94 as the quadrant is oscillated.

Each time the mold table is indexed, roller 58 engages cam 91 as shown in Fig. 14 and the raising of cam part 91 causes roller 58 to be raised to the height of cam part 88. Dot and dash line 91a indicates cam part 91 in its raised position. Raising of the roller occurs during 30° of the 45° table index; the 30° line being indicated by line W—X. When the roller reaches line W—X, it passes over seam 95 (Fig. 12) onto fixed cam part 88. When roller 58 reaches this line, rotary cam 101 will have traveled through the arc Y—Z. The remaining 15° of travel of the table index brings roller 58 to the position indicated by 58a, and rotary cam 101 will have passed through the arc Z—Z' and thus reversed the action of slide 97, returning lever 105 of the gear quadrant 103 to its original or down position as shown in Fig. 14 where it is ready to raise the hinged cam part 91 for the succeeding roller 58.

When roller 58 reaches line W—X, the transfer device begins to swing the neck mold with the parison suspended therefrom to position above the blow or finishing mold. Cam part 88 provides a level roller contact section embracing 30° of the table index and thus allows the transfer device to swing the neck mold and the suspended parison through the arc A to B to C (Fig. 1) during transfer of the parison to the blow or finishing mold. Cam part 88 also provides an incline 108 to support roller 58 during its travel down to its lowest position, during which the parison enters the blow mold preparatory to the initial phase of the finishing blow. Cam parts 88 and 91, forming cam 87, will be supplied in a number of heights (say four) so as to vary the lift of the transfer device to suit the length of the ware to be made.

A cam 109 secured to a cam holder 109a supported by stationary column 41 extends from about station M-4 to about station B-7, and is so constructed and arranged as to have opened the neck ring before the blow mold reaches station M-5 (Fig. 1). Roller 80 forming part of the neck ring opening mechanism (Figs. 3a and 10) is moved by said cam 109 toward shaft 59 which is part of the transfer device.

As the finishing mold leaves station M-5 and moves toward station M-6, roller 80 passes off of cam 109 which allows the neck ring to be closed by its spring 75. The neck ring is then lifted enough to clear the protruding upper end or finish of the jar or bottle by a cam 110, through the agency of roller 58 and the transfer mechanism above described. Cam 110 is secured to the base of the machine and its position is disclosed in Fig. 26 while its details are disclosed in Figs. 21 to 25 inclusive.

The finished bottle or jar is removed from the open finishing mold at station M-6 as will be later described.

By the time the finishing mold reaches station M-6, the neck ring will have been swung by a cam 111 through the arc C—D thus placing it above the top of the blank mold at station B-8. Cam 111 is carried by the housing of the machine and extends inwardly above spider 33 and engages roller 67 (Fig. 2) by which it swings the neck ring through the agency of the transfer mechanism.

*Blow or finishing molds and their operating mechanisms*

The blow or finishing molds (Figs. 1 and 9) are of the usual open and shut type and are formed in halves which close about a bottom member 112 (Fig. 9) as is now common. On the index from station M-5 to station M-6, each blow mold is opened by means of a cam 113 through the agency of a roller 114 which forms part of the blow mold operating mechanism.

Roller 114 which is mounted in a member 115 arranged to slide on parallel spaced rods 116, is connected with each half of the blow mold by a flexible connecting device made up of parts 117 and 118 and compression springs 119. The mold halves are adapted to be swung about pin 120 (Fig. 9) by means of this operating mechanism. Cam 113 is secured to cam holder 109a below cam 109, and is so constructed and arranged that as roller 114 reaches station M-1, the blow mold will be closed ready to receive the parison.

As pointed out in connection with the transfer devices, the neck ring or mold with the parison suspended therefrom, during the first 30° of 45° table index or travel from station B-2 to station B-3 is raised so that the parison is clear of the blank or parison mold and is then swung by cam 67a through the arc A—B (Figs. 1 and 12) and, during the next idle period, remains between stations M-1 and B-3, as shown in Fig. 1.

During the first 15° of the next 45° index, the parison is still being swung by cam 67a through the arc B—C, putting it in position above the top of the finishing mold. After leaving cam 67a, the remaining 30° of this index allows the parison to be lowered into the finishing mold, and the neck ring or mold to become assembled with the finishing mold, as shown in Fig. 9.

*Blow heads and finishing mold locking devices*

The three phase blowing procedure before referred to occurs during the idle periods when the blow or finishing molds are located at stations M-2, M-3 and M-4.

While the blow heads and the blow or finishing mold locking devices per se form no part of this invention, a general description of the same is believed desirable for a full understanding of this machine and its operation.

During the idle periods, while the blow or finishing molds are at stations M-2, M-3 and M-4, such molds are locked in closed position by air operated locking means and the three blow heads for performing the three phase finishing blow are lowered into blowing position, in which position they also clamp and lock the neck rings in closed position before blowing air is applied, as will be later described.

While the drawing of Figure 1 does not show the blow head at station M-2 (it having been omitted in order to show the position of the neck ring), it is to be understood that the blow head at station M-2 is the same as the blow heads at stations M-3 and M-4.

The blow head mechanisms and the locking devices which, as before said, in and of themselves form no part of this invention, are preferably such as disclosed in Patent 1,658,735 issued to Frank O'Neill on February 7, 1928.

Blow head mechanisms 121 and 122 located at stations M-3 and M-4 respectively, and that located at station M-2 which, as before noted, is not shown, are supported by support arms 123, secured to column 41 and to pairs of upright rods 124 mounted on and extending upwardly from the base of the machine.

Rods 124 carry the supports for the devices 125 for locking the blow or finishing molds in closed position at the finishing blow stations M-2, M-3 and M-4.

The blow or finishing molds, after receiving a parison at station M-1, remain closed until opened by cam 113 during indexing from station M-5 to M-6 at which point the finished ware (bottle or jar) is removed by the take-out device 32.

*Take-out device*

The jar or bottle as the case may be, is removed from the open blow or finishing mold at station M-6 by means of the take-out device 32 which is driven by a gear 126 meshing with teeth 31 on the outer peripheral edge of the mold carrying table.

The take-out device forms no part of this invention and is preferably such as disclosed in Patent 1,537,963 issued to Frank O'Neill on May 19, 1925.

Instead of having two ware gripping jaws for each gripping device as in said patent, I preferably employ three gripping jaws 127 at each end of the take-out arm 128 in order to insure gripping of the article no matter in what direction it tips from its support 112. The jaws grip the article (jar or bottle) immediately below its finish.

*Parison pressing device*

The parison pressing device is located at station B-2 and as before pointed out, is driven by the electric motor that drives the periodic motion mechanism, by which the mold table is indexed.

In a general way, the parison pressing device comprises a plunger which on its downward reciprocation, passes through the neck ring and into the blank mold to form the parison. In the mechanism for reciprocating the plunger, a crank is employed. This crank is adjustable as to the length of its throw for the purpose of taking care of long and short parisons used to make ware of different lengths. A compression spring is employed in the make-up of the plunger operating mechanism and forms a yielding connection between the plunger operating crank and the plunger, and thus prevents overpressing and also increases the time the plunger remains in the glass to set the parison. The device also embodies means for varying the stress of this spring and therefore the displacement depth of the plunger, while the machine is in operation.

The details of the parison pressing device are illustrated in Figs. 2, 3 and 3a, 4 and 4a, 6, 7 and 8.

The crank mechanism comprises an elongated slide box 129 (Figs. 3a and 4a) having a hollow cylindrical hub portion 130 secured to a horizontal shaft 131 which has a worm wheel 132 keyed thereto and meshing with a worm 133 keyed to a shaft 134 which forms part of the driving connections between the pressing device and the electric motor that operates the periodic motion mechanism. A slide 135 secured within slide box 129 for movement lengthwise thereof carries a crank arm 136 adjacent its inner end and is adjusted to and held in adjusted position by an adjustment screw 137. This screw is threaded within a central bore in slide 135, extends through an opening in the lower end of the slide box, is held against endwise movement by a cleat 138 and at its outer exposed end is provided with a wrench engaging portion 139.

A rod 140 connected to crank arm 136 by a yoke member 141, at its upper end is provided with a rack 142.

The crank mechanism and rod 140 are located within a housing 143 and the hub portion 130 of slide box 129 is journaled within suitable bearings secured within one side of said housing.

Rack 142 meshes with a gear quadrant 144 mounted for rotation on a horizontal shaft 145 secured against rotation within support members 146 by means of set screws 147. Support members 146 are secured to the housing side members as at 148.

Secured to opposite sides of gear quadrant 144 are two gear quadrants 149 which freely rotate with gear quadrant 144 about shaft 145. The rack portion 142 of rod 140 is held in engagement with gear quadrant 144 by a roller 150. This roller is mounted on a shaft 151 secured within the projecting spaced side portions 152 of a cover member 153. Cover member 153 with roller 150 and shaft 151 are inserted through an opening in the housing which is closed by the cover member which is bolted in place with roller 150 bearing against the back of the rack portion of rod 140. Side portions 152 of cover member 153 form side guides for rack portion 142.

From the above, it will be apparent that as slide box 129 is rotated by worm wheel 132 and worm 133, rod 140 will be reciprocated with a swinging movement and thus oscillate or partially rotate gear quadrants 144 and 149.

A pair of spaced parallel vertically disposed rods 155 are rigidly secured within upper brackets 156 and lower brackets 157 secured to the sides of the upper portion 143a of housing 143; upper portion 143a of the housing being open on its gear quadrant side as disclosed in Figs. 3 and 3a and Figs. 6 and 7.

Gear quadrants 149 mesh with a pair of spaced racks 158 secured to a crosshead 159 which, by means of sleeves 159a secured thereto, is mounted for vertical sliding movement on parallel rods 155 (Figs. 3, 4, 6, 7 and 8). The crosshead, midway between racks 158, is provided with a sleeve-like portion 160 formed to rotatably support a tubular member 161. Tubular member 161 is relieved between points 162 and 163, and below point 163, is provided with internal threads as at 164 (Fig. 3).

Endwise movement of tubular member 161 relative to sleeve-like portion 160 of the crosshead is prevented by an outwardly extending flange 165 at the bottom of such tubular member and a worm wheel 166 secured to its top and which overlies a bracket 167 secured to the crosshead. Bracket 167 has a portion 168 within which the shaft 169 of a worm 170 is mounted. Shaft 169 with its worm 170 is adapted to be rotated by a handwheel 171 for a purpose to be later described.

Extending through tubular member 161 is a tubular shaft 172 having a bushing 173 at each end which form a bearing for a telescoping tube 174 which I term the plunger tube. Tubular shaft 172 is threaded throughout a portion of its length as shown at 175 and its threads engage the threads of tubular member 161.

At its upper end, tubular shaft 172 has a support plate 176 secured thereto. Support plate 176 has secured thereto a pair of upwardly extending parallel rods 177 to the upper ends of which a second support plate 178 is secured. Support plate 178 is drilled to receive rods 177 and is held on the upper threaded ends of said rods by nuts 179. Plunger tube 174 extends loosely through an opening in support plate 178 and at its upper end is provided with means such as an elbow 180 or other fixture, for connecting its interior to a suitable supply of cooling liquid, as will be later referred to.

A spring 181 known as the set spring as well as the overpress spring, surrounds plunger tube 174 and is confined between support plate 178 and an abutment member 182 which is screwed onto the upper end of an enlarged portion of plunger tube 174 as at 183. The plunger tube 174 at its lower end is externally threaded as shown in Fig. 5 to receive a two piece plunger holder 184 to which the press plunger 185 is secured.

A follow ring 186 slidably mounted on the upper portion of the press plunger is secured to a bolster plate 187, which surrounds plunger holder 184, and is yieldingly held at the limit of its downward movement by a follow spring 188. This spring bears against the top of the bolster plate and is confined between said top and an adjustable spanner operated nut 189 (Fig. 3) threaded to tubular shaft 172.

A neck mold clamping ring 190 slidable on follow ring 186 is yieldingly held at the downward limit of its travel by a series of three springs 191 (only one being shown, Figs. 3a and 5) which surround the lower ends of three uniformly spaced guiding and movement limiting rods 192 which extend through vertical bores in radial extensions of bolster plate 187. These rods are provided with downward movement limiting heads 193.

Crosshead 159 is provided with an upstanding shell-like portion that loosely embraces one side of support plate 176 and prevents turning of such plate and therefore the assembly including support plate 178, rods 177 and spring 181 during rotation of worm wheel 166 and tubular member 161 to which said worm wheel is secured. In Figs. 3a and 4a, crank arm 136 is shown adjusted for its greatest throw and the parts operatively connected therewith and disclosed in Figs. 3 and 4 are shown in the positions they occupy when the crank is so adjusted.

Spring 181 which forms a yielding connection between crank arm 136 and press plunger 185 determines the depth to which the press plunger descends into the glass in the blank or parison mold. Because of this construction, when the press plunger, under the urge of set spring 181, reaches its maximum glass displacement depth, the crosshead, with tubular member 161 and tubular shaft 172 keeps on traveling downward throughout the full stroke to which the crank arm is adjusted, while the press plunger stands still. Inasmuch as there is a lag between the press plunger and the crosshead, the press plunger is allowed to remain in the glass to set the same during continued downward travel of the crosshead and until the press plunger and crosshead again travel together on the upward stroke.

Adjustment of tubular member 161 by hand operated worm 170 and worm wheel 166 attached to said tubular member, provides means for adjusting the tension of set spring 181 while the machine is in operation. By adjusting this tension, the set of the press plunger can be varied to suit the ware being made, the consistency of the glass and the shape and other characteristics of the ware.

This is important since too much set or too great a time during which the plunger is in contact with the glass may cause the extreme top of the parison to crizzle or check while too little set or too short a time will not properly prepare the glass to hold the neck portion or finish in shape for final blowing. It will be understood that the finish contour is cut in the neck ring or neck mold and that these are interchangeable for different types and sizes of ware.

The throw of crank arm 136 is adjusted by screw 137 to suit the length of the parison to be made, and adjustment of the tension of the set spring may have to be varied as the stroke of the crank arm is varied.

Follow ring 186 seals the cavity within the combined blank and neck molds during the pressing operation and clamping ring 190 clamps the neck mold in closed position and supplements the action of groove 194 within which the lower flange of the neck mold is held when assembled with the blank mold.

If there is too much glass in the blank mold during a pressing operation, the distance between abutment member 182 and support plate 176 increases, and a parison will be formed regardless of the overweight (within reason) of the charge of glass supplied to the blank mold. In the normal operation of commercial glass feeders, the weight of the charge does not vary more than one ounce either way.

Plunger holder 184 is threaded at 195 to receive the upper threaded end of a nozzle 196 which communicates with the interior of the plunger tube and projects downwardly into the hollow interior of the plunger terminating just short of the tip of the plunger. Whatever cooling medium is used for cooling the press plunger, the same will enter the plunger tube through fixture 180 at its top, will pass through nozzle 196 to the press plunger tip, flow up outside of said nozzle and be discharged through outlet 197 to a suitable drain or reservoir.

*Machine driving mechanism*

As before noted, the mold carrying table is driven by an electric motor through the medium of periodic motion mechanism 40 and this is similar in all essential particulars to that disclosed in Figs. 10 to 19 inclusive of my said U. S. Patent 2,298,215.

In this mechanism, a worm (not shown) is mounted on a horizontal shaft 198, and the worm meshes with a worm wheel (also not shown) secured to vertical shaft 199 of the periodic motion mechanism. Shaft 198 is driven by an electric motor 200 through a suitable variable speed device 201. Shaft 198, by means of suitable mitre gears 202 located beyond such worm, is connected to shaft 134 which carries worm 133. Worm 133 which meshes with worm wheel 132 drives shaft 131 of the parison pressing device (Fig. 4a).

As before pointed out, the periodic motion mechanism or table drive unit is arranged to advance the table through an arc of 45° and then stop the same and lock it in stop position. In other words (there being eight blank molds) said drive unit is adapted to index the table eight times during each complete revolution thereof.

The drive unit comprises a combined cam and gear assembly which is mounted for rotation about vertical shaft 199 and includes a cam member which co-operates with rollers 35 in starting and stopping the mold table and a gear segment that meshes with gear 38 to drive the mold table between stop periods.

The cam member comprises cam faces 203, 204, 205 and 206. These provide a closed camway for rollers 35 which extends from the end of face 203 to the end of face 204 and thus overlap cam face 205 (upper left-hand corner of Fig. 2). Gear segment 207 forming part of the assembly meshes with gear 38 carried by the table structure. The cam and gear assembly is continuously driven by electric motor 200 through reduction gear 201. This assembly rotates in a counterclockwise direction and the mold table therefore rotates in a clockwise direction.

From Figs. 2 and 3a, it will be seen that the gear segment 207 is located below the cam member instead of above as in my said Patent 2,298,215 and that therefore gear 38 is located below rollers 35.

Since the parison pressing device is mechanically operated by being geared to the motor that drives the periodic mechanism, it is possible to synchronize the same with the table drive unit and because of this, I can adjust the machine so that the press plunger enters the blank mold before the table comes to a stop at the pressing station and start the table on its next index before the press plunger is removed entirely from the blank mold. This gives a greater length of time for the pressing operation than the actual length of time between indexing periods, and would not be practicable in a machine utilizing an air or other fluid operated press plunger.

The table drive unit, in indexing the table 45° between the B stations, travels 180° of its cycle and I find that when using a press plunger having its lowermost end about 1" in diameter and using a neck ring having an internal diameter of at least 2", leaving a space of .5" between the internal periphery of the neck ring and the press plunger, I can so adjust the machine that said plunger enters such mold 15° before the end of such 180° travel and allow the plunger to remain within the blank mold until the table has traveled 15° of the 180° travel of the table drive unit which indexes the table from station B-2 to station B-3. In order to demonstrate this, I have included Figs. 15 to 20 inclusive.

In Fig. 15 which is a diagrammatic showing through the blank mold, plunger and neck ring, the press plunger (having its center line coinciding with the center line of the blank mold at station B-2) when said mold is at rest at such station is moving down to position to press or displace the charge of glass g to form a parison.

The press plunger as disclosed by the full line has traveled down about ⅓ of its maximum distance. The dot and dash semicircles represent the position of the press plunger with relation to the inner peripheral edge of the neck mold as the plunger progresses or moves toward the position shown by full line.

In Fig. 16, it is assumed that the plunger has traveled down, has displaced or pressed the glass to form parison h and has been traveled up to the position shown. This figure shows the center line of the plunger still coinciding with the center line of the mold and in the position, vertically of the mold, it will occupy when the table is ready to start on its index to station B-3.

As before pointed out, the table drive unit disclosed in Fig. 2 is shown in position where the table is about to start on its next index. From Fig. 16, it will be seen that the position of the plunger corresponds to the adjustment of the table drive unit. In other words, the parison pressing device is synchronized with the table drive unit.

In order to disclose this fact more clearly, I refer to Figs. 17 to 20 inclusive. In these figures, I have divided the movements of the table during its index from station B-2 to station B-3 into 5° movements of the table drive unit.

Each of Figures 17 to 20 inclusive discloses the distance that the blank mold (carried by the table) travels from the center line of the press plunger (the position of its vertical center line being fixed) during each of these 5° movements of the table drive unit. In Figs. 16 to 20 inclusive, as before mentioned, the press plunger is being raised.

Fig. 17, by lines a and b, shows that the mold (in the first 5° movement of the table drive unit) has traveled away from the center line of the plunger .041" and that the plunger on its upward movement has traveled approximately ¼ of the distance c; c representing the distance from the bottom of the plunger in Fig. 16 to the top of the neck ring flange 208.

Fig. 18, by lines a and b, shows the position of the mold after the table drive unit has traveled 10°, during which the mold has traveled away from the center line of the plunger .165". The plunger continuing its upward movement has traveled approximately one half of the distance c.

Fig. 19, by lines a and b, shows the position of the mold after the table drive unit has traveled 15°. The mold in this case has traveled away from the center line of the plunger .365" and the plunger, continuing its upward movement has traveled approximately ¾ of the distance c.

Fig. 20, by lines a and b, shows the position of the mold after the table drive unit has traveled 20°. Here the mold has traveled away from the center line of the plunger .651". It will be noted that the plunger, continuing its upward movement, has traveled the full distance c.

During the remaining 160° the table drive unit has to travel on its table driving cycle, the plunger continues rising until it reaches its maximum height above the mold, but since it has cleared the neck ring as shown in Fig. 20, it is considered unnecessary to carry the diagrammatic showings further.

The table (carrying the mold) continues on its index to station B-3 while the press plunger descends and enters the succeeding parison mold at station B-2. However, the last 20° of travel of the table drive unit, in its table driving cycle, before the table, and therefore the mold, come to rest at station B-3, the plunger on its down stroke is in the position shown by dotted semi-circle *j* (Fig. 15). It will be in the position *k*, 15° from the end of such driving cycle; at 1 at 10°; at 5° and at *n* when the table has stopped. The blank mold of course has picked up its charge of glass as before described at station B–1.

When the plunger is rising, the distance between its center line and the center line of the mold is the same as shown in Figs. 17 to 20 inclusive, since the motion of the plunger in rising, in relation to the inner peripheral edge of the neck ring, is the same as when the plunger is descending; the only difference being that when the plunger is descending it has more clearance than when rising, because of the fact that when descending, there is no parison within the blank mold and neck ring.

Power air controls

The blow head raising and lowering cylinders, the blow mold locking cylinders and the cylinders for raising and lowering the gripping jaws of the takeout device are all power air operated. The mechanism for controlling the distribution of this power air so that these devices operate in synchronism with the table and the parison pressing device is disclosed in Figs. 12 and 13 and is controlled by cam patches 209 and 210 adjustably secured to the rear face of rotary cam 101.

Cam 101 is keyed to shaft 131 of the parison pressing device and is located between such device and the case for worm gear 132 as disclosed in Fig. 2. In Fig. 4a, this cam has been omitted being keyed to that part of shaft 131 which in this view has been cut away.

The distribution of power air to the air operated devices is controlled by a piston valve having a cylindrical housing or case 211 secured to the bed plate of the machine adjacent rotary cam 101 (Figs 2 and 13). Piston rod 212 of this valve has its outer end connected, by means of a link 213, to one end of a lever 214 which is pivoted at 215 to the case for worm gear 132.

The free end of lever 214 carries a cam contact roller 216 which is alternately engaged by cam patches 209 and 210 during rotation of cam 101. This reciprocates piston rod 212 in synchronism with the other parts of the machine. A piston 217 connected to piston rod 212 has a reduced central portion 218 (Fig. 13). Valve cylinder or case 211 is provided with a port *p* which, by means of suitable piping represented by pipe 219 is connected to a suitable source of power air.

As shown in Fig. 13, cam 101 is in the position it occupies when the table is about to start indexing, and as shown, cam patch 209 has operated lever 214 to move piston 217 to position to permit power air to pass from port *p* to port *q*, by reason of the clearance around reduced portion 218 and thence to the bottom of the three blow head cylinders in order to raise the blow heads from blowing position, on top of the blow molds. Air issuing from port *q* also releases the blow mold locking devices and raises the piston that closes takeout jaws 127 around the finished ware. It also raises the piston that raises the takeout jaws to lift the finished ware off the bottom member 112 of the blow or finishing mold.

This is all done prior to the start of the next index and during such index the takeout device, through the medium of its gear 126 which meshes with teeth 31 of the mold table, swings the finished ware to the conveyor (not shown).

It will be noted that in the position shown port *r* is free to exhaust through ports *s* in end cap 220 of the housing or cylinder 221.

When the table has completed its index, cam 101 will have traveled 180° and cam patch 210 will have reversed the action of lever 214 and consequently the action of valve 217 to permit power air to pass from port *p* to port *r* allowing port *q* to exhaust through port *t* in valve housing cap 221.

Port *r* supplies power air to lower the blow heads into contact with the blow or finishing molds, or rather the neck rings above such molds for final blowing. Air supplied from port *p* through port *r* also causes the blow mold locking devices to lock the blow molds. It also lowers takeout jaws 127 to ware receiving position and causes such jaws to close around the finished bottle or jar for removal from position on bottom member 112 of the blow or finishing mold.

Neck ring or neck mold locking devices

As before pointed out, each partible neck ring 44, prior to the parison pressing operation at the pressing station B–2, is locked and clamped in closed position on top of the blank mold by clamping ring 190. This ring is part of the parison pressing mechanism, is slidable on follow ring 186, and is yieldingly held in clamping position by the series of springs 191 (Figs. 3a and 5).

Each neck ring is also locked in closed position and clamped to the top of the partible blow mold with which it co-operates, by a cup-like clamping member or ring 222. This member or ring is slidable on cylindrical portion 223 of the blow head (Fig. 9) and is yieldingly held in neck ring clamping position by means of a similar series of springs 224 each of which surrounds a rod 225 carried by said clamping ring 222 and which is interposed between the top of such clamping ring and the under side of its projecting portion 226 of the blow head.

These clamping members or rings form positive means for locking the partible neck rings or neck molds closed, and clamping the same to the tops of the blank and blow molds during the parison pressing and finishing blow operations. The neck rings of course are normally held in closed position by the springs 75, and are only opened as the blow or finishing molds approach the takeout point, after which they are again closed by springs 75 before each is assembled with its blank mold preparatory to receiving a charge of glass.

From the fact that during the finishing blow, the neck ring contacts with the top of the blow mold and the blow head contacts with the neck ring adjacent the top of the "finish," blowing of the parison to finished form takes place through the neck ring. This insures a level or even top to the "finish," and since this is the point at which the cap or closure member for the jar or bottle contacts in making the seal, this becomes important.

In those machines in which the finish blowing does not take place through the neck ring, a difference in temperature of the glass may cause articles blown in the same finishing mold to vary in height, producing an unevenness or variation in the top of the "finish." While this unevenness or variation is usually not more than about eight to ten thousandths of an inch, this is enough to cause breakage of the bottle or jar by its cap or closure member, or failure of the seal.

The periodic motion mechanism which is continuously driven by motor 200, indexes table A from station to station and locks the same against movement at the different stations, in other words between indexes. The parison pressing device is also continuously operated by said motor and is so timed with relation to the periodic motion mechanism and therefore the table movements that its parison pressing operations take place between table indexes or while the table is at rest and locked against movement.

Because of this, it is possible to so synchronize the table drive unit with the parison pressing device that there is no variation except for lost motion in the mechanisms and this of course can be reduced to a negligible amount. It is because of this that it is possible to allow the plunger of the parison pressing device to enter the blank mold before the table comes to rest at the pressing station and to remain within the blank mold after the table starts on its next index as before described.

The valve which allocates power air to the blow heads, the blow mold locking devices and the takeout device is also continuously operated by electric motor 200 through reduction gear 201. This valve is also timed to operate in synchronism with the table movements and while the table is at rest.

Having thus described my invention, what I claim as new and desire to secure by Letters Patent is:

1. In a glassware forming machine, a rotatably mounted mold carrier, multiple pairs of molds mounted on such carrier, each such pair comprising a blank or parison mold fixed with relation to such mold carrier and a blow or finishing mold, a partible neck ring or neck mold associated with each such pair, a parison forming device, a parison transfer device on such rotatable carrier for each such pair of molds, comprising neck ring support means mounted for vertical reciprocation and partial rotation, cam means including a pivoted cam section for raising such support means, cam means for partially rotating such support means while in raised position and cam means for permitting such neck ring support means to lower such neck ring into contact with the top of such blow mold; the construction and arrangement being such that when such support means is not being influenced by such cam means, such neck ring will rest on top of either a blank mold or a blow mold, and when under the influence of such cam means such support means will raise a parison carried by its neck ring until it clears such blank mold, will swing it to position above its associated blow mold and lower it into such blow mold.

2. A glassware forming machine as defined in claim 1 in which the parison forming device includes a crank-actuated press plunger mechanism having a set spring interposed between such actuating crank and such press plunger.

3. A glassware forming machine as defined in claim 2 in combination with means by which the set spring may be adjusted during operation of the parison forming device.

4. In a glassware forming machine, a mold carrier, multiple pairs of molds on such carrier, each such pair comprising a blank mold fixed with relation to such mold carrier and a partible blow or finishing mold, a transfer device carried by such carrier for each such pair and comprising a partible neck ring and neck ring support means mounted for vertical movement and partial rotation, cam means including a swinging cam segment for raising each such neck ring support means to a position such that a parison suspended by its neck ring is above the top of its associated blank mold, cam means for swinging such raised neck ring support means until such parison is above the associated blow mold, cam means for permitting such neck ring support means to be lowered so that such parison enters such blow mold until the neck ring from which it is suspended contacts with the top of such blow mold, and means for indexing such carrier to move such molds from station to station and for holding such carriers against movement at the stations.

5. In a glassware forming machine, a mold carrier, multiple pairs of blank and blow molds arranged in side by side relation on such carrier, a parison transfer device for each such pair of molds carried by such carrier and each comprising a partible neck ring and neck ring support means mounted for vertical movement and partial rotation to swing such neck ring toward and from such molds, cam means including a pivoted cam for raising each such neck ring through its support means to a position such that a parison suspended therefrom is above the top of its blank mold, cam means for rotating each such neck ring support means to swing its neck ring with a parison suspended therefrom to a position such that such parison is above its blow mold, cam means for permitting the lowering of each such parison into its blow mold with the neck ring in contact with the top thereof, means for indexing such carrier to move such molds from station to station and for holding such carrier against movement at the stations and an electric motor connected to drive such indexing means and to operate such pivoted cam.

6. A structure as defined in claim 1 in which the blank mold of each pair of molds precedes the blow mold during rotation of the mold carrier and the neck ring support means during transfer of a parison from a blank mold to a blow mold swings in a direction opposite to the direction of rotation of the mold carrier.

CLARENCE C. KINKER.

REFERENCES CITED

The following references are of record in the file of this patent:

UNITED STATES PATENTS

| Number | Name | Date |
|---|---|---|
| 608,022 | Bingham | July 26, 1898 |
| 619,694 | Power | Feb. 14, 1899 |
| 628,157 | Cleveland | July 4, 1899 |
| 805,027 | Pawling et al. | Nov. 21, 1905 |
| 1,331,472 | Peiler et al. | Feb. 17, 1920 |
| 1,601,836 | Stenhouse | Oct. 5, 1926 |
| 1,980,047 | Freese | Nov. 6, 1934 |
| 1,982,103 | Hiller | Nov. 27, 1934 |
| 2,357,501 | Carnahan | Sept. 5, 1944 |

FOREIGN PATENTS

| Number | Country | Date |
|---|---|---|
| 17,613 | Great Britain | 1899 |

Certificate of Correction

Patent No. 2,570,817    October 9, 1951

CLARENCE C. KINKER

It is hereby certified that error appears in the printed specification of the above numbered patent requiring correction as follows:

Column 2, line 15, before "carrying" insert *mold*; column 3, line 54, for "mechanisms" read *mechanism*; column 17, line 4, after the semicolon insert *at m*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*